(12) United States Patent        (10) Patent No.:     US 12,395,412 B2
Ficara et al.                     (45) Date of Patent:     Aug. 19, 2025

(54) METHOD AND APPARATUS FOR CROSS-LAYER, IN-BAND MONITORING OF TUNNELS BY INSERTION OF TELEMETRY DATA INTO A PACKET

(71) Applicant: Cisco Technology, Inc., San Jose, CA (US)

(72) Inventors: Domenico Ficara, Essertines-sur-Yverdon (CH); Vincent Cuissard, Eteaux (FR); Luca Bisti, Grosseto (IT); Alessandro Erta, Licciana Nardi (IT); Arun Khanna, Sunnyvale, CA (US); Frank Brockners, Cologne (DE)

(73) Assignee: Cisco Technology, Inc., San Jose, CA (US)

( * ) Notice: Subject to any disclaimer, the term of this patent is extended or adjusted under 35 U.S.C. 154(b) by 512 days.

(21) Appl. No.: 17/538,109

(22) Filed: Nov. 30, 2021

(65) Prior Publication Data

US 2023/0171172 A1    Jun. 1, 2023

(51) Int. Cl.
*H04L 43/08* (2022.01)
*H04L 12/46* (2006.01)

(52) U.S. Cl.
CPC .......... *H04L 43/08* (2013.01); *H04L 12/4633* (2013.01)

(58) Field of Classification Search
CPC . H04L 43/08; H04L 12/4633; H04L 41/0806; H04L 41/142; H04L 43/0805; H04L 43/0817; H04L 41/0894; H04L 41/122; H04L 43/16; H04L 43/20; H04L 43/0852; H04L 43/0876; H04L 43/06
See application file for complete search history.

(56) References Cited

U.S. PATENT DOCUMENTS 10,887,209 B2   1/2021   Nainar et al.
11,050,664 B2   6/2021   Chen et al.
(Continued)

FOREIGN PATENT DOCUMENTS

CN    115811330 A  *  3/2023
WO    2018188464      10/2018
(Continued)

OTHER PUBLICATIONS

Machine translated version of CN 115811330 A retrieved from PE2E on Mar. 14, 2024 (Year: 2023).*
(Continued)

*Primary Examiner* — Joseph E Avellino
*Assistant Examiner* — Adam Joel Cerlanek
(74) *Attorney, Agent, or Firm* — Behmke Innovation Group LLC; James M. Behmke

(57) ABSTRACT

In one embodiment, a network device along a path in a network receives a schedule that controls when the networking device is to insert telemetry data into data traffic passing through the networking device. The networking device generates the telemetry data for insertion into the data traffic passing through the networking device. The networking device inserts, according to the schedule, the telemetry data into a particular packet of the data traffic passing through the networking device. The networking device sends the particular packet to a next hop along the path in the network.

16 Claims, 9 Drawing Sheets

(56) References Cited

U.S. PATENT DOCUMENTS

| | | | | |
|---|---|---|---|---|
| 2009/0141740 | A1* | 6/2009 | Baruah | H04L 47/10 370/469 |
| 2013/0138266 | A1* | 5/2013 | Koike | A63H 30/04 701/2 |
| 2017/0111209 | A1* | 4/2017 | Ward | H04L 41/342 |
| 2019/0372877 | A1 | 12/2019 | Nainar et al. | |
| 2020/0145318 | A1 | 5/2020 | Nainar et al. | |
| 2020/0351172 | A1 | 11/2020 | Vasseur et al. | |
| 2021/0111992 | A1* | 4/2021 | Nainar | H04L 45/70 |
| 2021/0218658 | A1 | 7/2021 | Vasseur et al. | |
| 2023/0096238 | A1* | 3/2023 | Hofman-Bang | H04L 49/3027 370/216 |

FOREIGN PATENT DOCUMENTS

| | | |
|---|---|---|
| WO | 2020114083 | 11/2020 |
| WO | 2021034428 A2 | 2/2021 |
| WO | 2021034428 A3 | 2/2021 |

OTHER PUBLICATIONS

Define schedule [online]. Oxford Languages, Google [retrieved on Jul. 10, 2024]. Retrieved from the Internet: <URL: https://www.google.com/search?q=define+schedule&rlz=1C1GCEA_enUS1077US1077&oq=define+&gs_Icrp=EgZjaHJvbWUqCAgAEEUYOBg7MgglABBFGDgYOzIQCAEQABiDARixAxiA> (Year: 2024).*

Brockners, et al., "Data Fields for In-situ OAM", Internet Draft draft-ietf-ippm-ioam-data-15, Oct. 3, 2021, 48 pages, IETF Trust.

Jena, Satyabrata, "Difference between Control Plane and Data Plane", online: https://www.geeksforgeeks.org/difference-between-control-plane-and-data-plane/#:~:text=01 .- , Jul. 27, 2021, 2 pages, GeeksForGeeks.

European Search Report issued on Apr. 12, 2023, in connection with European Patent Application No. EP22205423.

* cited by examiner

METHOD AND APPARATUS FOR CROSS-LAYER, IN-BAND MONITORING OF TUNNELS BY INSERTION OF TELEMETRY DATA INTO A PACKET

TECHNICAL FIELD

The present disclosure relates generally to computer networks, and, more particularly, to the cross-layer, in-band monitoring of tunnels.

BACKGROUND

Cellular network coverage has made Internet connectivity increasingly ubiquitous. This has led to an ever-increasing demand for bandwidth, to accommodate traffic such as multimedia content and communications (e.g., bandwidth-intensive high definition video streaming or real time video calls, etc.). For instance, passengers of public transportation now expect on-board, high-speed connectivity, which implies a reliable wireless ground-to-vehicle communication. Accordingly, wireless mesh networks are now being deployed, to provide connectivity to such fast-moving nodes.

Monitoring a network, such as a wireless mesh network, requires the collection of telemetry data from various parts of the network. However, doing so is not a zero-cost operation and consumes resources that could otherwise be devoted to data traffic in the network. In other words, it is often unfeasible for every networking device in a network to stream every possible form of telemetry data in real time, for purposes of assessing the health of the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
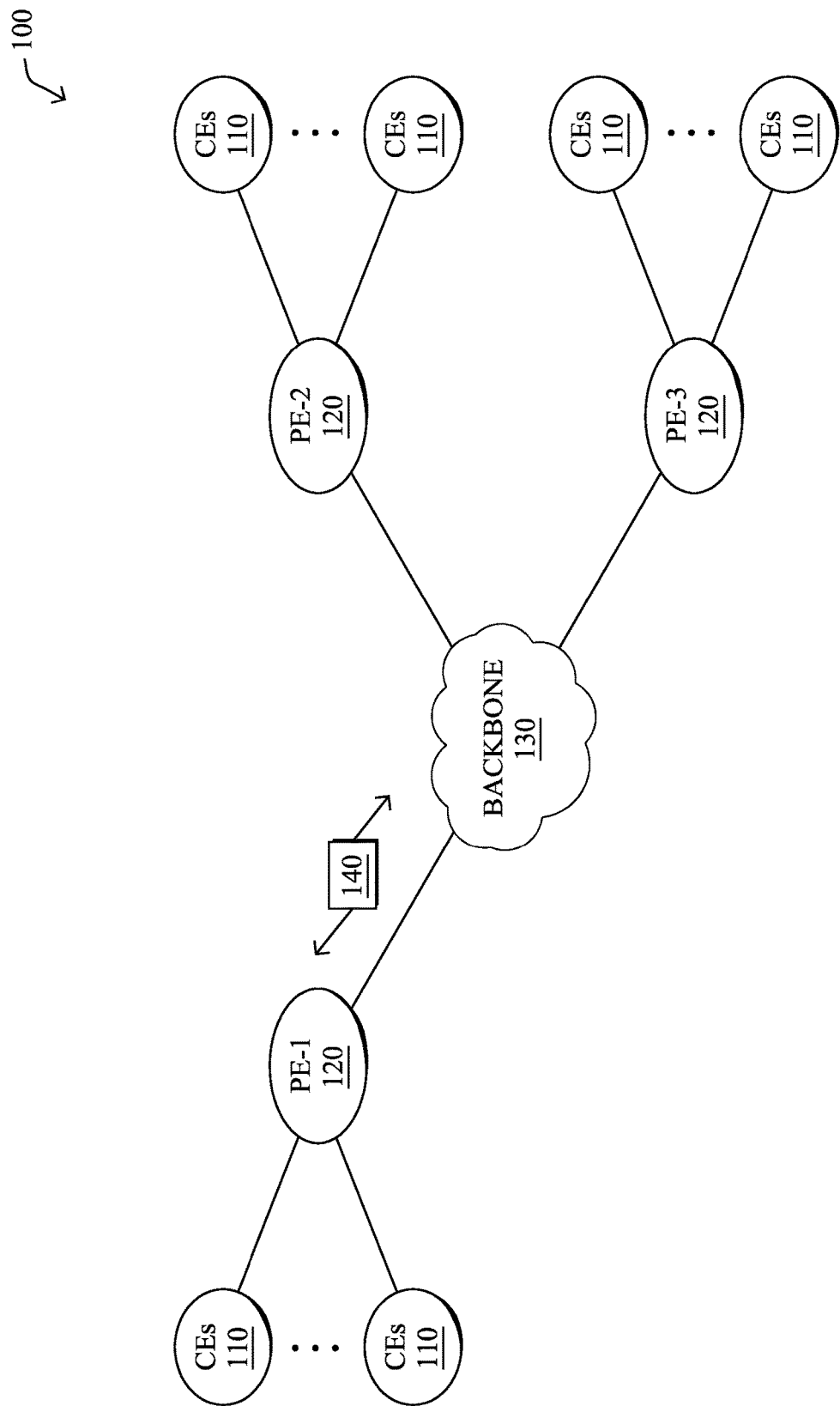
FIGS. 1A-1B illustrate an example communication network.

According to one or more embodiments of the disclosure, a network device along a path in a network receives a schedule that controls when the networking device is to insert telemetry data into data traffic passing through the networking device. The networking device generates the telemetry data for insertion into the data traffic passing through the networking device. The networking device inserts, according to the schedule, the telemetry data into a particular packet of the data traffic passing through the networking device. The networking device sends the particular packet to a next hop along the path in the network.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
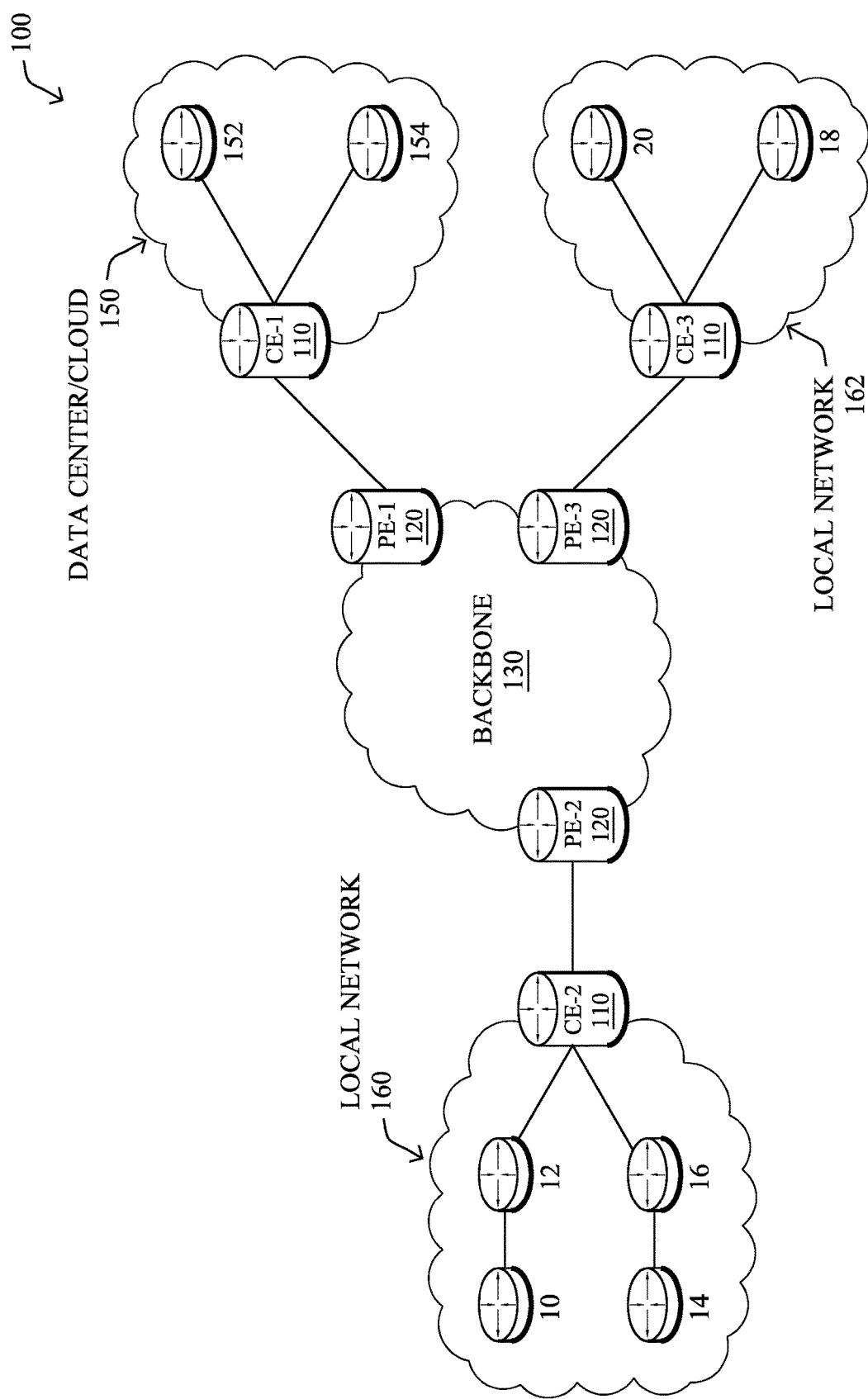

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
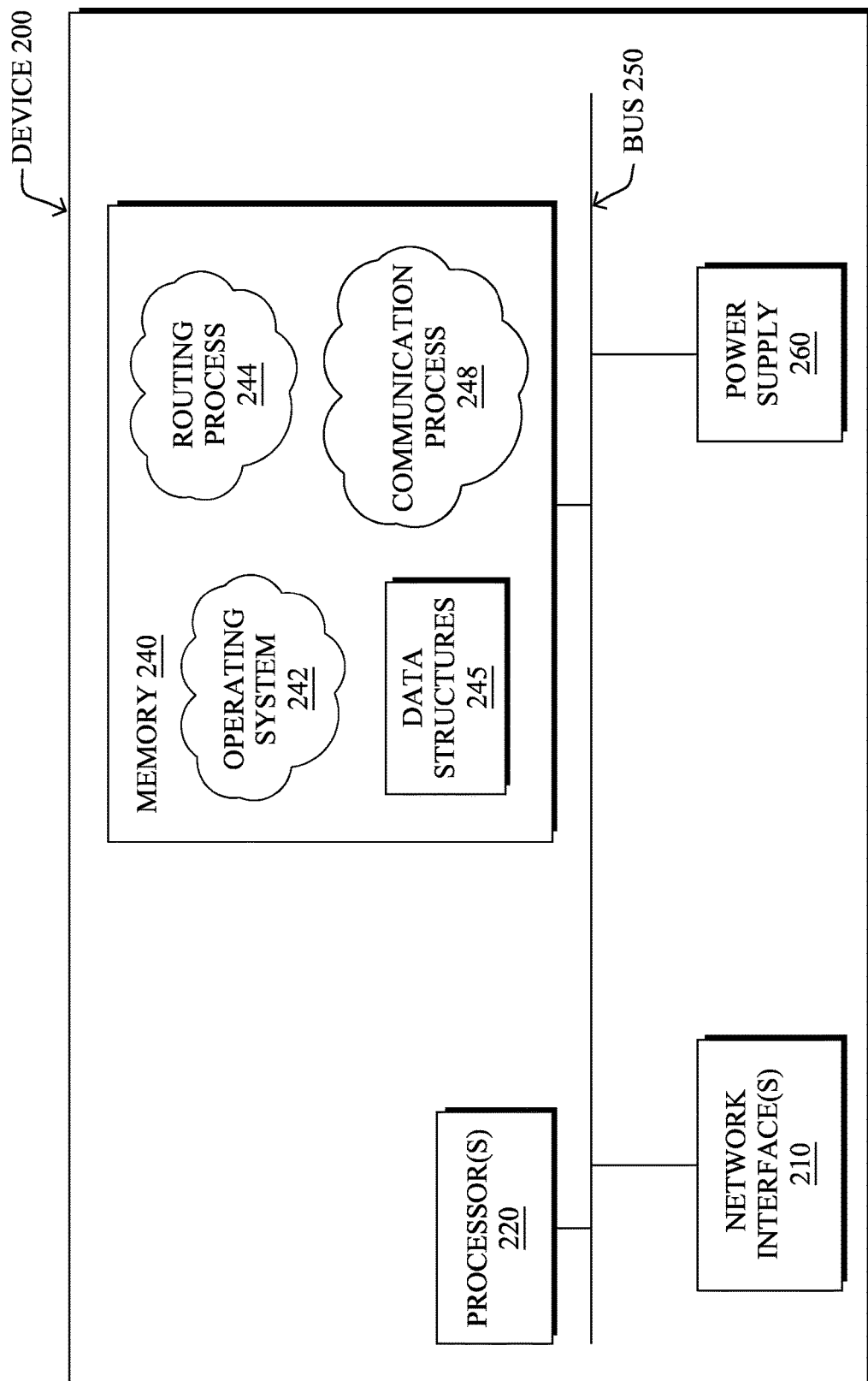
FIG. 2 illustrates an example network device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected/coupled by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, Ethernet, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a routing process 244 and/or a communication process 248.

It will be apparent to those skilled in the art that other processor and memory types, including various computer-readable media, may be used to store and execute program instructions pertaining to the techniques described herein.

Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In general, communication process 248 includes instructions executable by processor 220 to perform functions related to a mobile system roaming from one wireless access point to another. To this end, communication process 248 may operate in conjunction with routing process 244, in some instances, to establish and maintain one or more LSPs between a mobile system and the backend infrastructure. An example protocol that uses label-switched paths is the Multiprotocol Label Switching (MPLS) protocol. In general, MPLS operates by appending an MPLS header to a packet that includes a label 'stack.' The label(s) in the stack are inserted by a label edge router (LER) based on the forwarding equivalence class (FEC) of the packet. Paths are also managed via the Label Distribution Protocol (LDP) or Resource Reservation Protocol-Traffic Engineering (RSVP-TE). Another protocol that communication process 248 may utilize is the Control and Provisioning of Wireless Access Points (CAPWAP) protocol.

Figure 3:
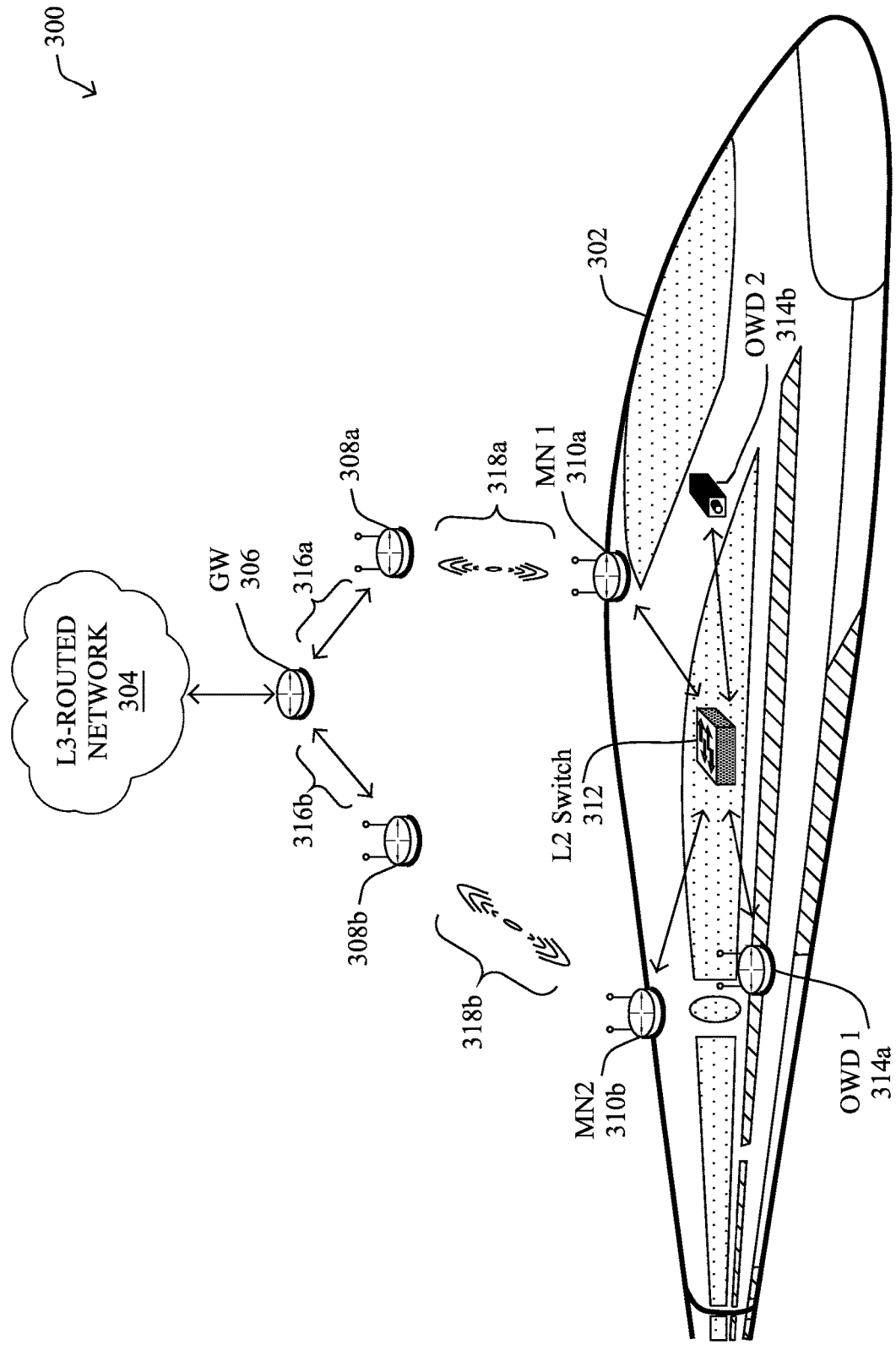
FIG. 3 illustrates an example of a mobile system communicating wirelessly.

FIG. 3 illustrates an example 300 of a mobile system communicating wirelessly, according to various embodiments. As shown, the mobile system 302 may generally take the form of any mobile object or set of objects equipped with its own internal network and configured to communicate wirelessly with a backhauling system during motion. For instance, mobile system 302 may take the form of a train, bus, airplane or other flying vehicle, ferry, automobile, mine cart, crane, truck, another form of vehicle that may be used for transportation or shipping, a vehicle that may be found in a worksite, mining location, industrial site, factory, etc., a robot, or the like. In further cases, mobile system 302 may be a fully-autonomous, or partially-autonomous, vehicle or other system that moves with little or no direct human control.

Onboard mobile system 302 may be various networking devices that support the mobile domain of mobile system 302. In some embodiments, as shown, there may be a Layer-2 (L2) switch 312 onboard mobile system 302 that is connected to any number of onboard devices 314 within the mobile domain of mobile system 302. For instance, onboard device 314*a* may take the form of an onboard Wi-Fi™ access point that provides connectivity to any number of user devices (e.g., mobile phones, computers, etc.) of passengers being transported by mobile system 302. Conversely, onboard device 314*b* may take the form of a security camera that is also connected to L2 switch 312. In various embodiments, some or all of the onboard devices 314 may be onboard wired devices (OWDs), meaning that they communicate with L2 switch 312 via wired connections, such as an Ethernet network or the like.

According to various embodiments, the mobile domain of mobile system 302 may also include a plurality of mobile nodes 310, denoted "MN" in the Figures for simplicity. For instance, as shown, mobile system 302 may include a first MN 310*a* and a second MN 310*b*. Each MN 310 may generally include: 1.) a wireless interface to exchange data with wireless access points of the backhaul network and 2.) a local interface to exchange data with the local network of mobile system 302. For instance, MN 310*a* and MN 310*b* may each have a wired connection to L2 switch 312.

As would be appreciated, MN 310*a* and MN 310*b* may be located on mobile system 302 at a distance from one another, so as to provide spatial diversity to the potential wireless connection points utilized by mobile system 302. For example, MN 310*a* may be located near the front of mobile system 302 (e.g., the head-end of a train), while MN 310*b* may be located farther towards the rear of mobile system 302 than that of MN 310*a*. Thus, even if a particular MN 310 does not have a reliable wireless connection to the backhaul system, another MN 310 of mobile system 302 may (e.g., if the train is going around a curve in the track, etc.). In some instances, MNs 310 may also offer frequency diversity, as well, such as by operating on different frequencies, at least part of the time. As a result, even if one frequency is experiencing interference, the other frequency could be used to form a wireless connection between mobile system 302 and the backhaul system.

Located along the path of travel of mobile system 302 (e.g., a railroad track, a road, a waterway, a runway, etc.) may be any number of wireless access points/base stations 308. For instance, as shown, there may be trackside access points (APs)/base stations 308*a*-308*b* shown. Note that while these wireless access points are referred to herein as 'trackside,' their locations can be varied depending on the deployment scenario (e.g., roadside, etc.).

During operation, base stations 308*a*-308*b* may form wireless connections with MN 310*a* and/or MN 310*b*, to provide wireless connectivity to mobile system 302 as it travels. To this end, each base station 308 may include at least 1.) a wireless interface to communicate with a MN 310 and 2.) an interface to communicate with a gateway, denoted "GW" 306 in the Figures for simplicity. Typically, the connections between base stations 308*a*-308*b* and GW 306 are wired connections that use a suitable wired communication protocol, such as Ethernet.

GW 306 represents the other end of the backhauling system and provides Layer-3 (L3) routing functions. To do so, GW 306 may include at least one interface connected to L3-routed network 304, as well as any number of interfaces to communicate with base stations 308. For instance, L3-routed network 304 may take the form of the Internet, in many instances, although the techniques herein may be extended to any number of different types of external networks, as desired.

Traditionally, a backhaul system supporting mobile domains/systems relies on the use of multiple tunnels, to convey traffic between the L3 gateway and the mobile domain/system. For instance, as shown, assume that MN 310a has formed a wireless connection 318a with base station 308a. Such a connection may be formed using a suitable transmission protocol, such as the Prodigy protocol by Fluidmesh™ (now Cisco Systems™) or another wireless protocol that supports extremely fast handoffs. Consequently, MN 310a may establish a first tunnel over wireless connection 318a. GW 306 and base station 308a may form a second tunnel via their connection 316a, likewise. Thus, when base station 308a sends traffic that it receives from MN 310a towards GW 306, it may encapsulate the traffic and tunneled via the first tunnel, which base station 308a then encapsulates for transport via the second tunnel to GW 306. A similar approach may be taken with respect to wireless connection 318b between MN 310b and base station 308b, as well as connection 316b between base station 308b and GW 306.

In alternative embodiments, a single L2 tunnel may be established between each base station 308 and GW 306. This tunnel will carry L2 traffic between GW 306 and the MN 310 to which the base station 308 is connected. For instance, a first L2 tunnel may be formed between GW 306 and base station 308a over which traffic conveyed between base station 308a and MN 310a may be transported, assuming that wireless connection 318a exists. Similarly, another GW 306 and base station 308b may form a second L2 tunnel over which traffic conveyed between base station 308b and MN 310b may be transported, assuming that wireless connection 318a exists.

Typically, only a single wireless link is active at any given time between a mobile system, such as mobile system 302, and any given base station 308. For instance, assume that MN 310a is wirelessly connected to base station 308a. In such a case, any other MN 310 on mobile system 302 (e.g., MN 310b, etc.) may be in an idle state at that time. In other words, one of the mobile nodes (e.g., MN 310a) may be designated as the primary, while the other is designated as the secondary (e.g., MN 310b) and remains idle. As mobile system 302 roams, the primary node may begin passing its traffic to the secondary node, to begin leveraging its own connection to the fixed infrastructure. In turn, the roles of the two nodes may be switched, thereby making MN 310a the secondary node and MN 310b the primary node.

As noted above, backhaul connectivity in many wireless mesh networks in fixed deployments for fast-moving clients/nodes rely on some form of tunneling, such as through the use of MPLS, CAPWAP, EoGRE, or the like. In many of these cases, tunneling is hierarchical in that tunnels are carried within tunnels, in order to preserve segmentation across different domains and abstract network characteristics. To do so, a packet may be encapsulated any number of times with different tunnel headers, during its transit to its destination (e.g., the network gateway, etc.).

One of the challenges with respect to the above approach relates to the collection of telemetry data along the paths/tunnels of the network. Indeed, it is often difficult, if not impossible, to obtain a full picture of all of the important, key performance indicators (KPIs) on all of the different network nodes/devices for purposes of the following:
  selecting the best networking devices for path instantiation
  highlighting potential issues
  troubleshooting
  acting upon failure to perform restoration
To perform the above, there needs to be a telemetry collection mechanism in the network capable of capturing and reporting on information such as the health of a deployment in terms of node/device health, link health, traffic statistics, or the like.

Cross-Layer In-Band Monitoring of Tunnels

The techniques herein introduce various mechanisms for the collection of telemetry data in an intelligent manner across a network path over which any number of tunnels may extend. In some aspects, the techniques herein provide for the collection of the telemetry data using an in-band/in-situ approach, whereby the telemetry data is inserted into data traffic conveyed over the path. In another aspect, the techniques herein introduce scheduling mechanisms for the telemetry reporting that can help to reduce overhead on the path and conserve bandwidth. In a further aspect, the techniques herein also introduce dynamic mechanisms that allow a networking device to select where the telemetry data is to be inserted into a particular packet, so as to select the most efficient encoding available.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein, potentially in conjunction with routing process 244.

Specifically, in various embodiments, a network device along a path in a network receives a schedule that controls when the networking device is to insert telemetry data into data traffic passing through the networking device. The networking device generates the telemetry data for insertion into the data traffic passing through the networking device. The networking device inserts, according to the schedule, the telemetry data into a particular packet of the data traffic passing through the networking device. The networking device sends the particular packet to a next hop along the path in the network.

Operationally, the techniques herein propose extending in-situ operations, administration, and management (iOAM) approaches to network paths over which multiple tunnels may span and in an intelligent manner. In general, iOAM, also sometimes referred to as "in-band" OAM, entails piggybacking data in the data plane for purposes of reporting OAM data. As would be appreciated, network operations are often classified as being part of a control plane or a data plane. Typically, the control plane is responsible for signaling and controlling how paths in the network are established and used. In contrast, the data plane is used to transmit data packets (e.g., those conveying data to/from a user device, etc.) over those paths established by the control plane.

By way of example, say a user submits certain information to a website. During transmission of those packets, a processing networking device may insert certain OAM data into those packets, such as the ingress and egress identifiers for the interfaces over which the packets are received and sent. In doing so, a downstream device is able to extract this information from the data packets. Without such a mechanism, the ingress and egress identifiers would otherwise need to be sent to the downstream device via their own packets.

In networks that rely on tunneling, such as certain wireless backhaul networks, insertion and extraction of iOAM data becomes somewhat complicated, as the data packets flowing along the tunnel(s) are also encapsulated. This raises the question: where should any iOAM data be inserted into a packet? In addition, as would be appreciated, each networking device along a path inserting iOAM data into each data packet traversing that device could very will impinge on the operation of the network. This is because doing so could consume additional resources (e.g., bandwidth, memory, etc.) and reduce the performance of the path/tunnel, such as by taking longer to process each packet.

According to various embodiments, certain aspects of the techniques herein propose implementing iOAM scheduling on the networking devices along a path/tunnel in the network. More specifically, in order to efficiently use the bandwidth and other resources of the path, the techniques herein propose relaxing the requirement that telemetry data be inserted into the data traffic at each node, at any given point in time and/or for any given packet. Rather, nodes insert telemetry information when it's their turn to "speak."

Figure 4:
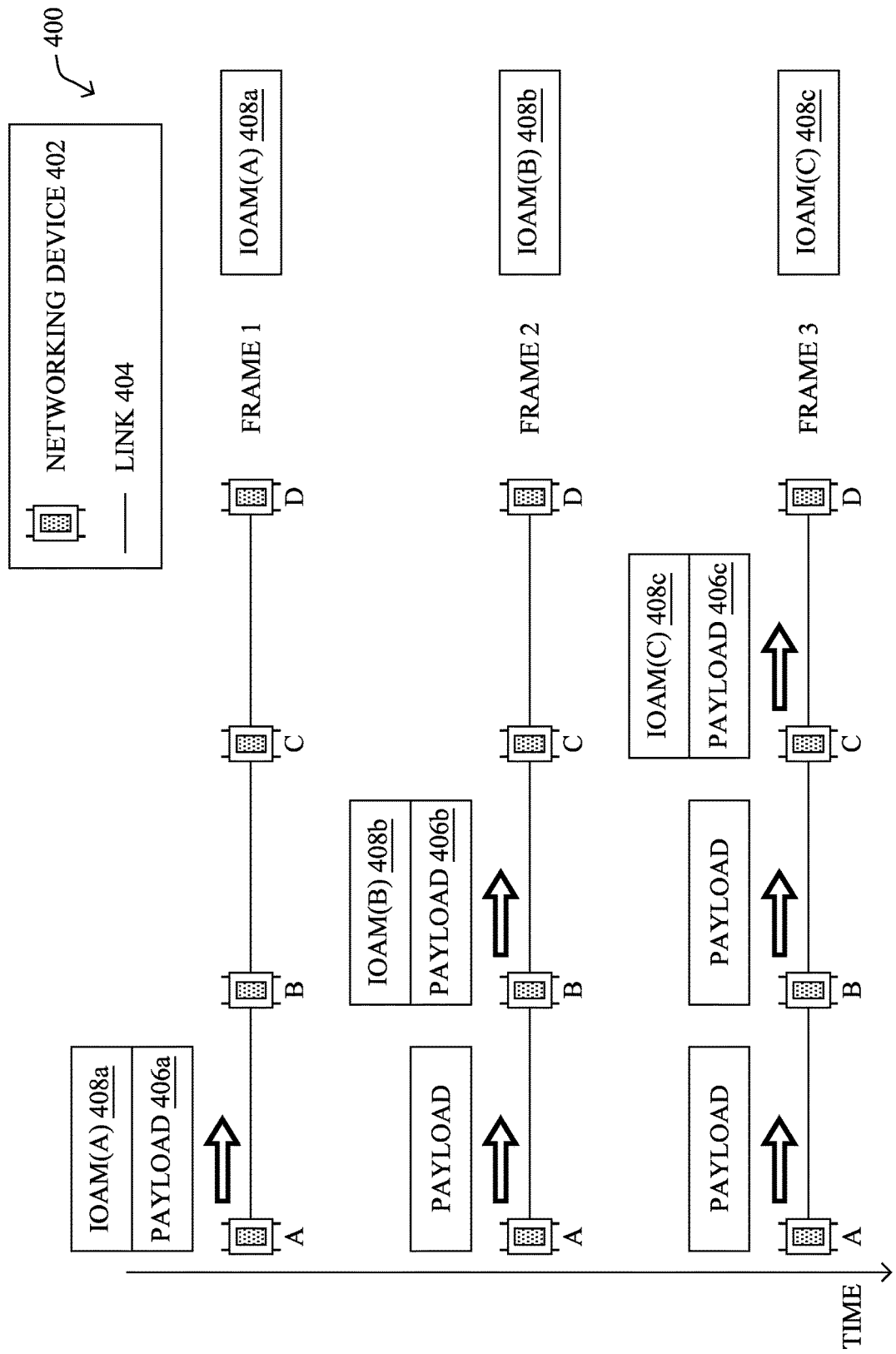
FIG. 4 illustrates an example of the scheduling of telemetry data to be inserted into data traffic by networking devices along a path.

By way of example, consider FIG. 4 which shows a network path 400 over the course of time. As shown, path 400 may include any number of networking devices 402 interconnected by links 404 (e.g., wireless links, wired links, etc.). For instance, networking devices 402 may take the form of wireless nodes, wireless access points/base stations, switches, routers, gateways, any of the devices described previously, or the like. For simplicity, path 400 is shown to include four networking devices 402, denoted devices A-D. However, the techniques herein are limited as such and could be used for paths including any number of interconnected networking devices.

In some embodiments, any or all of devices A-D may obtain a reporting schedule that controls when it is to insert telemetry data into data traffic passing through the networking device. For instance, such a schedule may be provided to a given networking device 402 along path 400 by a supervisory device or service (e.g., the network gateway, a network controller, etc.), computed by the networking device itself, or even from another networking device along path 400, in some instances.

In one embodiment, the reporting schedule of a networking device 402 may be based in part on the topology of the network or, more specifically, path 400. More specifically, each of devices A-D may be aware of at least a portion of the topology of the network, such as the number of hops present along path 400. Here, the idea is that each node keeps track of the number of packets/frames (N) on the same tunnel. In turn, in some embodiments, when N % n_hops==k and the device is in $k^{th}$ position in the path, then it is that device's turn to provide iOAM information/telemetry data via the data traffic (e.g., traffic sent over the data plane of the network). This approach keeps a very short overhead on the frame by spreading the reported telemetry data across multiple frames.

More specifically, devices A-D may each generate any or all of the following telemetry data:
  Node health information, such as available/consumed CPU, memory, etc.
  Node interface queuing information, such as queue status information, traffic statistics, estimated delays, or the like.

These are critical pieces of information to determine what are the best nodes to use for a handover in the case of roaming and for path instauration whenever a new connection is established.

Once generated, a networking device 402 may use its topology knowledge, as well as the number of frames/packets of the data traffic, to determine when it is its turn to insert its telemetry data into a particular frame/packet, in accordance with its schedule. For instance, as shown, device A may insert telemetry/iOAM data 408a into a first frame 406a, based on the location of device A along the path, as well as a count associated with frame 406a. Similarly, device B may insert iOAM data 408b into a second frame 406b and device C may insert iOAM data 408c into a third frame 406c. In doing so, the iOAM data 408 may be spread across multiple frames, reducing the overhead on networking devices 402.

In some embodiments, the schedules of networking devices 402 may be fixed, according to their priority. For instance, the following sequence indicates a potential scheduled ordering to this reporting: A, B, A, C, A, B, A, C, etc. However, in further embodiments, the reporting sequence may also be dynamic through the use of one or more scheduling rules.

In one embodiment, each reporting networking device 402 may be assigned a credit/bandwidth that controls the maximum number of iOAM opportunities and/or telemetry data that it can send in any given epoch of N frames/packets. Such a policy rule may ensure that any given networking device 402 only reports up to a maximum amount of telemetry data every threshold number of data packets. Thus, in some instances, a deficit round robin (DRR)-like scheduling approach or even a more refined approach, can be used for the scheduling, while still keeping the iOAM bandwidth overhead under control.

In further embodiments, the schedules of networking devices 402 may also take into account the level of urgency/criticality of the telemetry data being reported. In one embodiment, for instance, the scheduling may allow for "URGENT" bits of information to be inserted by any networking device 402, if their information is very critical, potentially with different 'credit' requirements, as well.

Figure 5A:
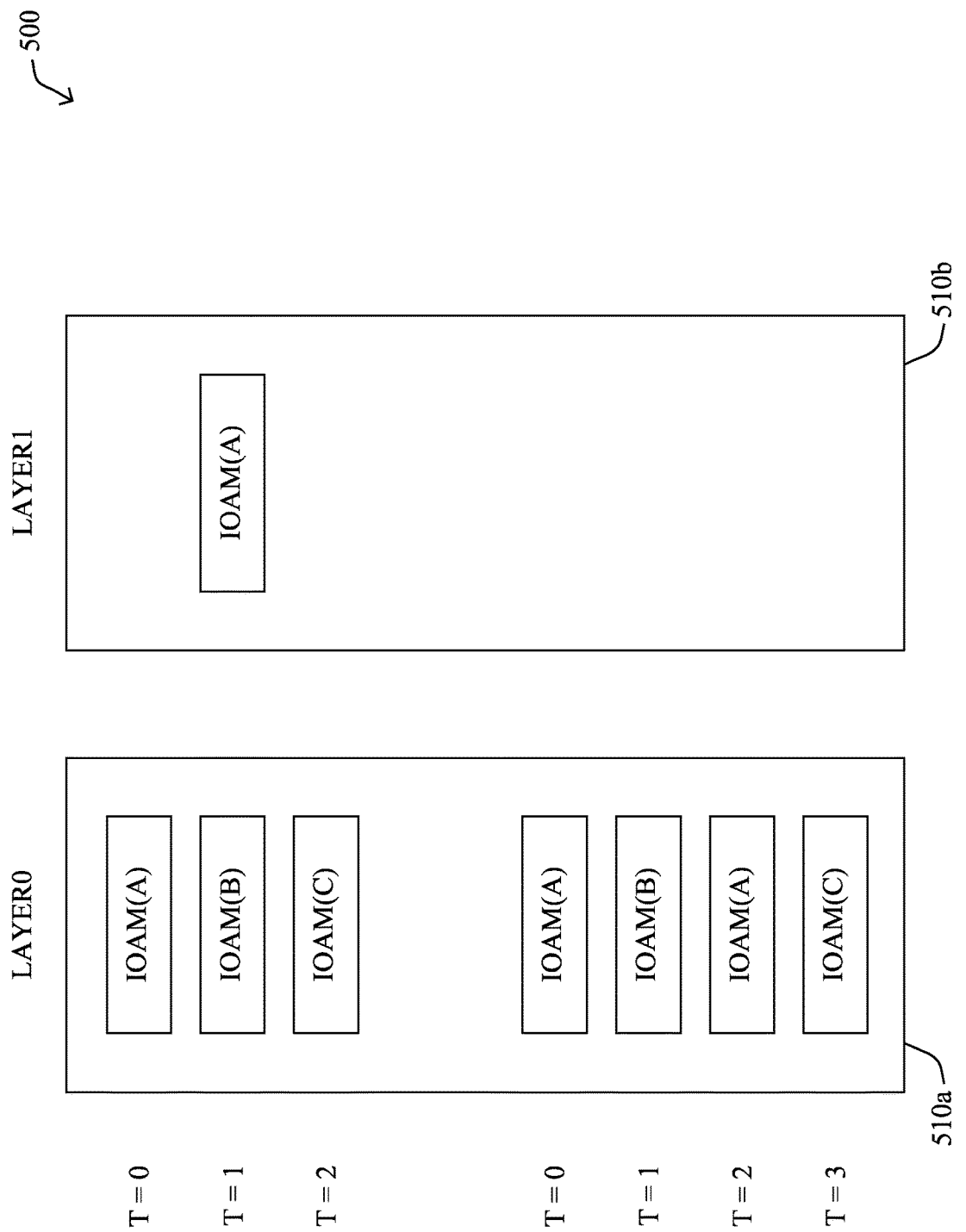
FIGS. 5A-5B illustrate examples of different layers of a packet into which telemetry data may be inserted.

To prevent iOAM information stacking, different iOAM layers may be utilized for any given packet. For instance, FIG. 5A illustrates an example 500 of a first iOAM layer 510a and a second iOAM layer 510b that may be utilized. Over any given time period (e.g., times T=0 to T=3), first iOAM layer 510a may be used by the networking devices to report their telemetry/iOAM data that has a base or default degree of criticality. Use of the second iOAM layer 510b, however, may be reserved for the reporting only of critical telemetry data, such as certain events.

In other words, scheduling can be determined for each layer, and have different decisions for each iOAM layer, in some embodiments. For instance, as shown, networking device A may insert its normal telemetry data into a frame/packet at time T=0, but then also insert critical telemetry data into a subsequent frame/packet at time T=1, even though this deviates from its baseline reporting schedule. Of course, while bifurcated iOAM layers are show in FIG. 5A, this is for exemplary purposes only, and further embodiments provide for additional layers to be used for additional categories of criticality (e.g., NORMAL criticality, MEDIUM criticality, HIGH criticality, etc.).

Figure 5B:
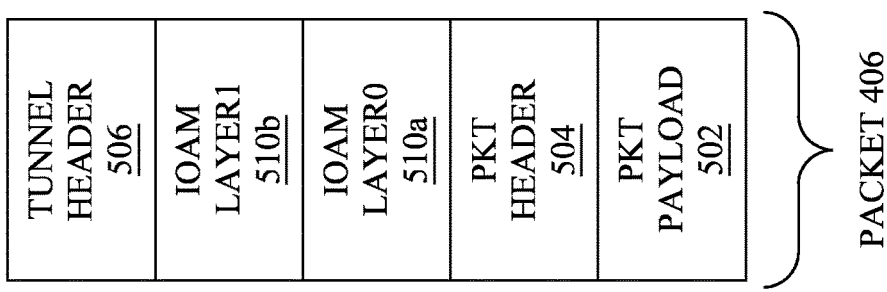

FIG. 5B illustrates an example frame/packet 406 having different iOAM layers into which telemetry data may be inserted by one or more networking devices along a path via which frame/packet 406 is conveyed. As shown, frame/packet 406 may include a payload 502 via which user and/or application data may be sent. Frame/packet 406 may also include a packet header 504. In various embodiments, packet 406 may also be encapsulated using one or more tunnel headers 506, as it is communicated via a path/tunnel. Indeed, if tunnel-in-tunnel encapsulation is used in the network, frame/packet 406 may have multiple tunnel headers 506.

As shown, telemetry data may be inserted by a networking device processing packet 406 into either of two iOAM layers 510a-510b, such as according to the criticality of the reported telemetry data. Here, iOAM layers 510a-510b may be implemented as one or more headers inserted into packet 406. The data fields of that header are then used to carry the telemetry data from the networking device. This allows any subsequent receiver of packet 406 to extract and process the telemetry data.

According to various embodiments, the techniques herein also provide for the efficient encoding of any telemetry/iOAM data within a packet by a networking device. A key observation herein is that when multiple encapsulations are present, it does not really matter at what encapsulation level the iOAM telemetry is inserted. In other words, whenever one encapsulation layer is requiring telemetry, this is a transitive property that can be applied to the whole frame and, therefore, the telemetry data can be encapsulated in any header. However, it has also been noted that each protocol has different ways of encoding iOAM data according to standard. Thus, in some embodiments, the networking device inserting telemetry data into a frame/packet may select a particular location (e.g., encapsulation layer) in the packet that offers the best encoding efficiency metrics associated with those encapsulation layers.

Figure 6:
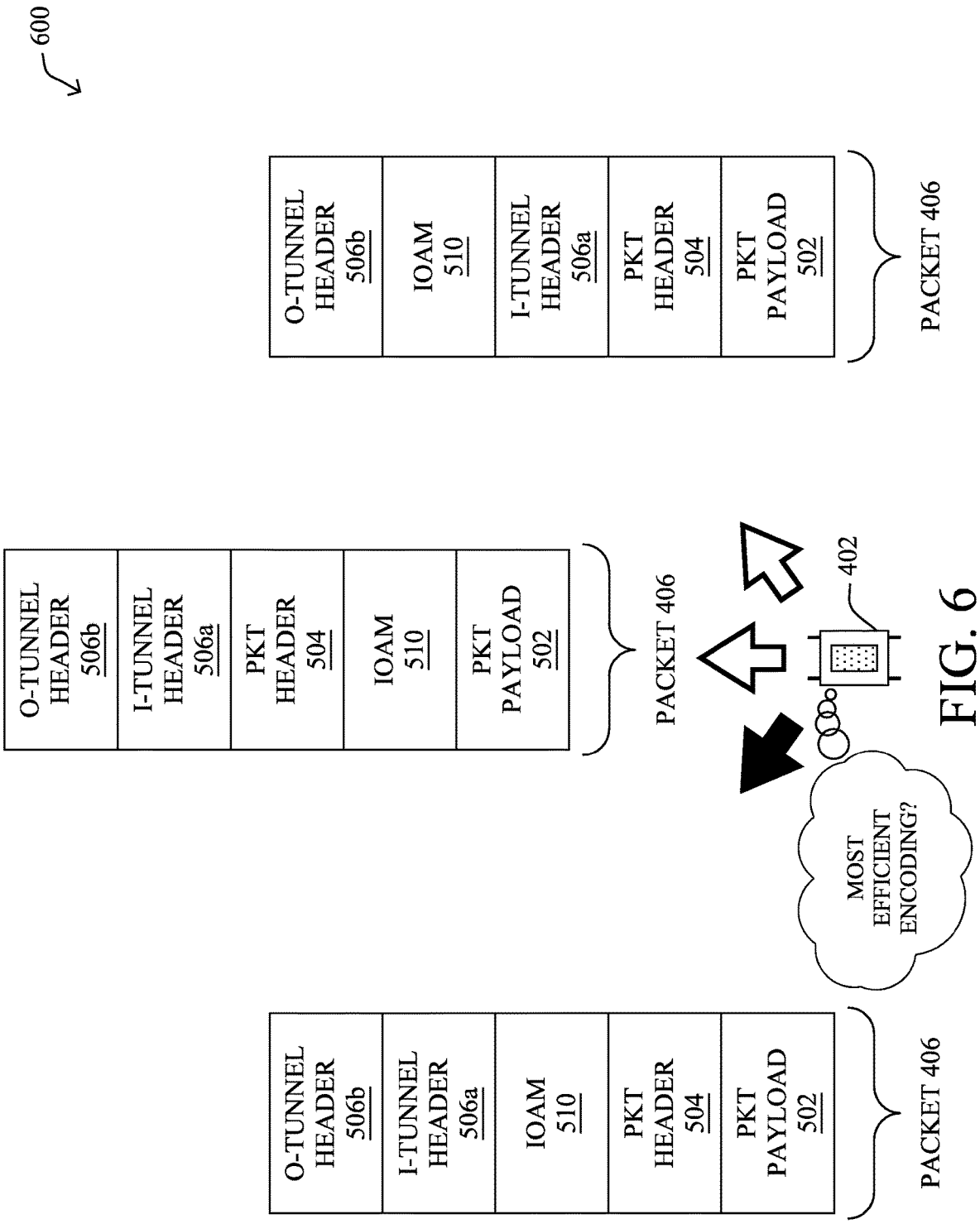
FIG. 6 illustrates an example of a networking device selecting a location to insert telemetry data into a packet.

FIG. 6 illustrates an example 600 of a networking device selecting a location to insert telemetry data into a packet, according to various embodiments. As shown, assume that a networking device 402 receives a frame/packet 406 and is to insert telemetry/iOAM data into it, before sending it on to the next hop along the path. In this specific instance, frame/packet 406 may include two tunnel encapsulation headers: an internal tunnel (I-tunnel) header 506a and an outer-tunnel (O-tunnel) header 506b. Consequently, three possibilities exist with respect to where networking device 402 can insert its telemetry data:

Between packet header 504 and I-tunnel header 506a;
Between packet payload 502 and packet header 504; or
Between I-tunnel header 506a and O-tunnel header 506c.

In various embodiments, networking device 402 may evaluate the three options, to select the one that offers the best encoding efficiency. For instance, networking device 402 may opt to insert iOAM layer/header 510 between packet header 504 and I-tunnel header 506a, if doing so offers the best encoding efficiency. To do so, in some embodiments, this evaluation may be computed offline and provided to networking device 402 in the form of a lookup-table for performance reasons.

In some embodiments, the efficient encoding mechanism introduced herein can also be used in conjunction with the scheduling and/or prioritization mechanisms described previously. For instance, while a singular iOAM layer/header 510 is shown in FIG. 6, such a header may be bifurcated (or further divided) to support multiple reporting layers having different criticalities, as shown in FIG. 5B. In addition, networking device 402 may only make its evaluations of the encoding efficiencies when it is to insert telemetry data into a given frame/packet, in accordance with its schedule.

Figure 7:
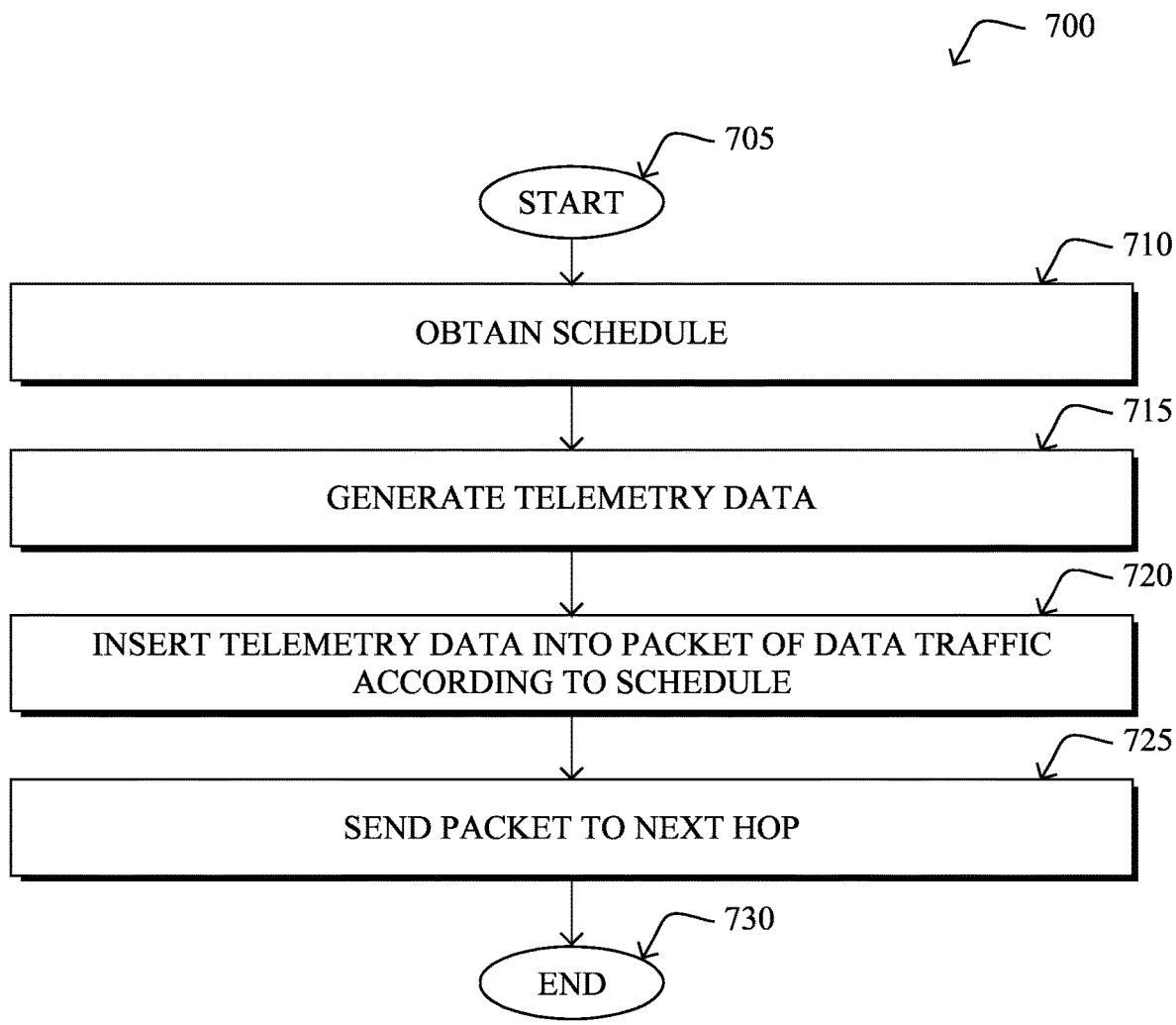
FIG. 7 illustrates an example simplified procedure for the cross-layer, in-band monitoring of tunnels.

FIG. 7 illustrates an example simplified procedure (e.g., a method) for the cross-layer, in-band monitoring of tunnels, in accordance with one or more embodiments described herein. For example, a non-generic, specifically configured device/apparatus (e.g., device 200), located along a path in a network (e.g., a tunnel), may perform procedure 700 by executing stored instructions (e.g., communication process 248 and/or routing process 244). Procedure 700 may start at step 705 and continues on to step 710 where, as described in greater detail above, the device may obtain a schedule that controls when the networking device is to insert telemetry data into data traffic passing through the networking device. In one embodiment, the schedule allows the networking device to insert the telemetry data into any packet of the data traffic, when the telemetry data is deemed urgent. In another embodiment, the schedule is based in part on a location of the networking device within a topology of the path. In a further embodiment, the schedule specifies a maximum amount of telemetry data that the networking device can insert into the data traffic every threshold number of packets. In yet another embodiment, the schedule allows the networking device to insert the telemetry data into packets of the data traffic at a particular cadence according to an ordering of those packets.

At step 715, as detailed above, the device may generate the telemetry data for insertion into the data traffic passing through the networking device. In some embodiments, the telemetry data comprises health data for the networking device indicative of at least one of: memory consumption by the networking device or processor availability at the networking device. In further embodiments, the telemetry data comprises interface data for the networking device indicative of at least one of: a queueing status, an estimated interface delay, or traffic statistics for an interface of the networking device.

At step 720, the device may insert, according to the schedule, the telemetry data into a particular packet of the data traffic passing through the networking device, as described in greater detail above. In some embodiments, the device may insert the telemetry data into the particular packet in part by selecting a particular encapsulation layer from among a plurality of encapsulation layers of the particular packet into which the telemetry data is to be inserted, based on encoding efficiency metrics associated with those encapsulation layers. For instance, the plurality of encapsulation layers may include an inner tunnel header and an outer tunnel header of the particular packet. In one embodiment, the particular encapsulation layer is selected further in part based on the schedule.

At step 725, as detailed above, the device may send the particular packet to a next hop along the path in the network. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for the cross-layer, in-band monitoring of tunnels, it is to be understood that various other adaptations and modifications may be made within the spirit and scope of the embodiments herein. For example, while certain embodiments are described herein with respect to using certain wired and/or wireless protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    obtaining, by a networking device along a path in a network, a schedule that controls when the networking device is to insert telemetry data into data traffic passing through the networking device;
    generating, by the networking device, the telemetry data for insertion into the data traffic passing through the networking device;
    selecting, by the networking device, a particular encapsulation layer from among a plurality of different encapsulation layers of the data traffic into which the telemetry data is to be inserted based on encoding efficiency metrics associated with those encapsulation layers and the schedule that controls when the networking device is to insert the telemetry data;
    inserting, by the networking device and according to the schedule, the telemetry data into the particular encapsulation layer of a particular packet of the data traffic passing through the networking device; and
    sending, by the networking device, the particular packet to a next hop along the path in the network.

2. The method as in claim 1, wherein the telemetry data comprises health data for the networking device indicative of at least one of: memory consumption by the networking device or processor availability at the networking device.

3. The method as in claim 1, wherein the telemetry data comprises interface data for the networking device indicative of at least one of: a queueing status, an estimated interface delay, or traffic statistics for an interface of the networking device.

4. The method as in claim 1, wherein the schedule allows the networking device to insert the telemetry data into any packet of the data traffic, when the telemetry data is deemed urgent.

5. The method as in claim 1, wherein the plurality of different encapsulation layers comprises an inner tunnel header and an outer tunnel header of the particular packet.

6. The method as in claim 1, wherein the schedule is based in part on a location of the networking device within a topology of the path.

7. The method as in claim 1, wherein the schedule specifies a maximum amount of telemetry data that the networking device can insert into the data traffic every threshold number of packets.

8. The method as in claim 1, wherein the schedule allows the networking device to insert the telemetry data into packets of the data traffic at a particular cadence according to an ordering of those packets.

9. An apparatus, comprising:
    one or more network interfaces;
    a processor coupled to the one or more network interfaces and configured to execute one or more processes; and
    a memory configured to store a process that is executable by the processor, the process when executed configured to:
        obtain a schedule that controls when the apparatus is to insert telemetry data into data traffic passing through the apparatus along a path in a network;
        generate the telemetry data for insertion into the data traffic passing through the apparatus;
        select a particular encapsulation layer from among a plurality of different encapsulation layers of the data traffic into which the telemetry data is to be inserted based on encoding efficiency metrics associated with those encapsulation layers and the schedule that controls when the apparatus is to insert the telemetry data;
        insert, according to the schedule, the telemetry data into the particular encapsulation layer of a particular packet of the data traffic passing through the apparatus; and
        send the particular packet to a next hop along the path in the network.

10. The apparatus as in claim 9, wherein the telemetry data comprises health data for the apparatus indicative of at least one of: memory consumption by the apparatus or processor availability at the apparatus.

11. The apparatus as in claim 9, wherein the telemetry data comprises interface data for the apparatus indicative of at least one of: a queueing status, an estimated interface delay, or traffic statistics for an interface of the apparatus.

12. The apparatus as in claim 9, wherein the schedule allows the apparatus to insert the telemetry data into any packet of the data traffic, when the telemetry data is deemed urgent.

13. The apparatus as in claim 9, wherein the plurality of different encapsulation layers comprises an inner tunnel header and an outer tunnel header of the particular packet.

14. The apparatus as in claim 9, wherein the schedule is based in part on a location of the apparatus within a topology of the path.

15. The apparatus as in claim 9, wherein the schedule allows the apparatus to insert the telemetry data into packets of the data traffic at a particular cadence according to an ordering of those packets.

16. A tangible, non-transitory, computer-readable medium storing program instructions that cause a networking device along a path in a network to execute a process comprising:
    obtaining, by the networking device along the path in the network, a schedule that controls when the networking device is to insert telemetry data into data traffic passing through the networking device;
    generating, by the networking device, the telemetry data for insertion into the data traffic passing through the networking device;
    selecting, by the networking device, a particular encapsulation layer from among a plurality of different encapsulation layers of the data traffic into which the telemetry data is to be inserted based on encoding efficiency metrics associated with those encapsulation layers and the schedule that controls when the networking device is to insert the telemetry data;
    inserting, by the networking device and according to the schedule, the telemetry data into the particular encapsulation layer of a particular packet of the data traffic passing through the networking device; and sending, by the networking device, the particular packet to a next hop along the path in the network.

* * * * *